United States Patent
Tsunoda et al.

(10) Patent No.: US 11,143,820 B2
(45) Date of Patent: Oct. 12, 2021

(54) OPTICAL CONNECTOR MODULE

(71) Applicant: KYOCERA CORPORATION, Kyoto (JP)

(72) Inventors: Masatoshi Tsunoda, Machida (JP); Kazumi Nakazuru, Yokohama (JP); Takahiro Suzuki, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/622,247

(22) PCT Filed: Jun. 16, 2017

(86) PCT No.: PCT/JP2017/022406
§ 371 (c)(1),
(2) Date: Dec. 12, 2019

(87) PCT Pub. No.: WO2018/229992
PCT Pub. Date: Dec. 20, 2018

(65) Prior Publication Data
US 2020/0103596 A1 Apr. 2, 2020

(51) Int. Cl.
*G02B 6/32* (2006.01)

(52) U.S. Cl.
CPC ..................... *G02B 6/32* (2013.01)

(58) Field of Classification Search
CPC .............. G02B 6/32; G02B 6/30; G02B 6/36
See application file for complete search history.

(56) References Cited

U.S. PATENT DOCUMENTS

| 4,707,063 | A | | 11/1987 | Plummer | |
|---|---|---|---|---|---|
| 5,039,193 | A | * | 8/1991 | Snow | G02B 6/327 385/25 |
| 5,241,612 | A | * | 8/1993 | Iwama | G02B 6/32 385/59 |
| 6,044,187 | A | * | 3/2000 | Duck | G02B 6/2937 385/33 |
| 6,567,583 | B2 | * | 5/2003 | Mettler | G02B 6/14 385/28 |

(Continued)

FOREIGN PATENT DOCUMENTS

| CA | 1096214 | 2/1981 |
|---|---|---|
| JP | 53-100260 | 9/1978 |

(Continued)

*Primary Examiner* — Andrew Jordan
(74) *Attorney, Agent, or Firm* — Duane Morris LLP

(57) ABSTRACT

An optical connector module can contribute to a reduction in size while reducing coupling loss. An optical connector module (1) according to the present disclosure includes an optical transmission line (10) including cores (12) and a cladding (11), an optical connector (20) including a first side surface (A1) facing an end face of the cores (12) and configured to optically couple to the optical transmission line (10), and a refractive index matching material (30) configured to adjust the refractive index of a space between the cores (12) and the first side surface (A1). The refractive index matching material (30) is disposed between the first side surface (A1) and the end face. A curved first lens portion (23) is provided on the first side surface (A1) at a position opposite the cores (12).

6 Claims, 13 Drawing Sheets

(56) References Cited

U.S. PATENT DOCUMENTS

| | | | |
|---|---|---|---|
| 6,865,323 B2* | 3/2005 | Samiec | G02B 6/12016 385/15 |
| 7,068,882 B2* | 6/2006 | Saito | G02B 6/2552 385/123 |
| 7,574,085 B2* | 8/2009 | Hirose | C03C 25/105 385/38 |
| 7,627,215 B2* | 12/2009 | Lin | G02B 6/43 385/31 |
| 8,057,106 B1* | 11/2011 | Zhovnirovsky | G02B 6/322 385/74 |
| 8,061,904 B1* | 11/2011 | Greenberg | G02B 6/4206 385/74 |
| 8,787,714 B2* | 7/2014 | Morioka | G02B 6/4286 385/33 |
| 8,876,401 B2 | 11/2014 | Shiraishi | |
| 8,882,362 B2 | 11/2014 | Shiraishi | |
| 9,046,664 B2 | 6/2015 | Tamura et al. | |
| 9,285,553 B2* | 3/2016 | Shibuya | G02B 6/32 |
| 9,429,706 B2 | 8/2016 | Hatori | |
| 9,726,824 B1* | 8/2017 | Berger | G02B 6/3594 |
| 10,379,293 B2* | 8/2019 | Nakazuru | G02B 6/3885 |
| 10,698,161 B2* | 6/2020 | Fukuda | G02B 6/30 |
| 10,698,165 B2* | 6/2020 | Kadar-Kallen | G02B 6/3839 |
| 10,705,299 B2* | 7/2020 | Nakama | G02B 6/32 |
| 2002/0085805 A1* | 7/2002 | Mettler | G02B 6/32 385/28 |
| 2002/0191911 A1* | 12/2002 | Ukrainczyk | G02B 6/255 385/33 |
| 2003/0048987 A1* | 3/2003 | Saito | G02B 6/4203 385/33 |
| 2003/0128932 A1* | 7/2003 | Samiec | G02B 6/1203 385/50 |
| 2007/0211999 A1 | 9/2007 | Kobayashi et al. | |
| 2009/0169155 A1* | 7/2009 | Lin | G02B 6/43 385/31 |
| 2009/0285531 A1* | 11/2009 | Hirose | G02B 6/3636 385/43 |
| 2011/0280522 A1 | 11/2011 | Tamura et al. | |
| 2011/0292661 A1* | 12/2011 | Yamada | G02B 6/4214 362/341 |
| 2013/0011100 A1 | 1/2013 | Shiraishi | |
| 2013/0177280 A1 | 7/2013 | Nielson et al. | |
| 2013/0287342 A1 | 10/2013 | Júnior et al. | |
| 2014/0166200 A1 | 6/2014 | Shiraishi | |
| 2014/0254990 A1* | 9/2014 | Hiyama | G02B 6/32 385/84 |
| 2014/0376860 A1* | 12/2014 | Mitsui | G02B 6/32 385/33 |
| 2015/0049990 A1* | 2/2015 | Shibuya | G02B 6/32 385/93 |
| 2015/0277044 A1* | 10/2015 | Hatori | G02B 6/1228 385/43 |
| 2016/0195677 A1* | 7/2016 | Panotopoulos | G02B 6/4228 250/227.23 |
| 2018/0314009 A1* | 11/2018 | Nakazuru | G02B 6/3882 |
| 2018/0335573 A1* | 11/2018 | Wada | G02B 6/3818 |
| 2019/0121026 A1* | 4/2019 | Fukuda | G02B 6/32 |
| 2019/0265417 A1* | 8/2019 | Nakama | G02B 6/3847 |
| 2020/0192003 A1* | 6/2020 | Kikuchi | H01L 33/58 |
| 2020/0341207 A1* | 10/2020 | Nakama | G02B 6/32 |

FOREIGN PATENT DOCUMENTS

| | | |
|---|---|---|
| JP | S59-088713 A | 5/1984 |
| JP | 2000-304966 A | 11/2000 |
| JP | 2003-5230 A | 1/2003 |
| JP | 2004004487 A | 1/2004 |
| JP | 2010-96903 A | 4/2010 |
| JP | 2012-3245 A | 1/2012 |
| JP | 2012054673 A | 3/2012 |
| JP | 2013-20027 A | 1/2013 |
| JP | 2014-115352 A | 6/2014 |
| JP | 2015-175979 A | 10/2015 |
| JP | 2015191112 A | 11/2015 |
| JP | 2016-57588 A | 4/2016 |
| JP | 2016-080902 A | 5/2016 |
| WO | 2017072993 A1 | 5/2017 |

* cited by examiner

FIG. 2
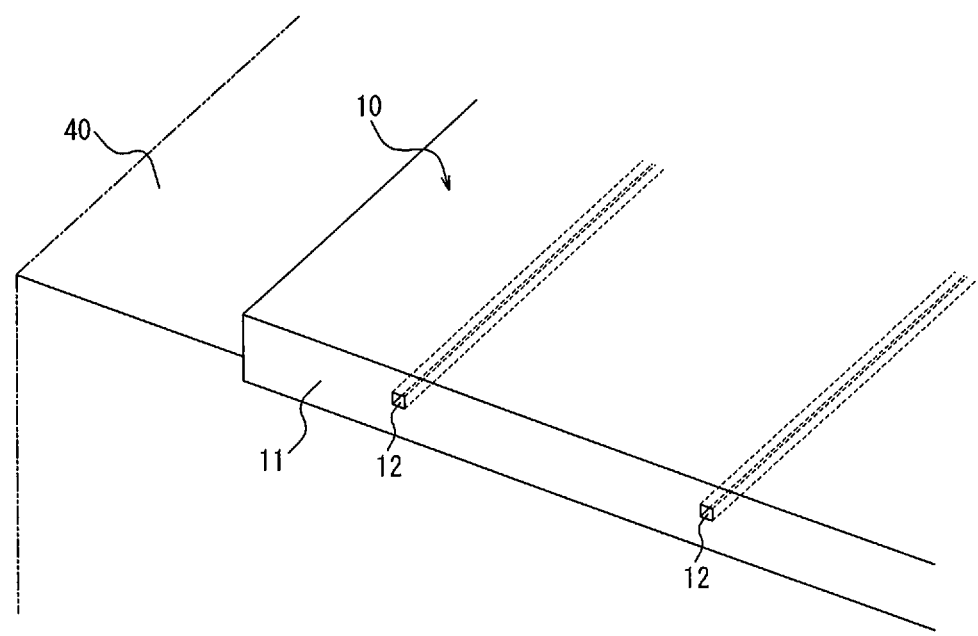
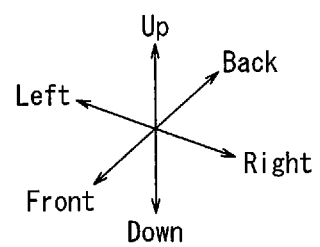

OPTICAL CONNECTOR MODULE

TECHNICAL FIELD

The present disclosure relates to an optical connector module for optically coupling an optical transmission line and an optical connector.

BACKGROUND

A connector for optical connection to optically couple optical transmission lines to each other is known. For example, patent literature (PTL) 1 discloses providing a lens member to suppress coupling loss between an optical fiber and an optical waveguide.

CITATION LIST

Patent Literature

PTL 1: JP2016-009081A

SUMMARY

Technical Problem

Coupling loss is preferably reduced insofar as possible when different optical transmission lines are coupled to each other. However, in the connector for optical connection disclosed in PTL 1, for example, a lens is formed on the outer surface opposite from the surface facing the optical transmission line in the lens member, producing a diffraction effect of light over a greater distance. This incurs the risk of increased coupling loss.

To reduce the size of the module overall, which includes the optical waveguide and the connector for optical connection, the connector for optical connection is preferably reduced in size insofar as possible. The distance between the optical transmission line and the lens that performs optical adjustment to a desired beam state, however, is long in a connector for optical connection such as the one in PTL 1, for example. This configuration therefore prevents a reduction in size.

The present disclosure was conceived in light of these problems and aims to provide an optical connector module that can contribute to a reduction in size while reducing coupling loss.

Solution to Problem

To resolve the aforementioned problem, an optical connector module according to a first embodiment includes:

an optical transmission line comprising a core and a cladding;

an optical connector comprising a first side surface facing an end face of the core and configured to couple optically to the optical transmission line; and a refractive index matching material configured to adjust a refractive index of a space between the core and the first side surface;

the refractive index matching material being disposed between the first side surface and the end face; and a first lens portion that is curved being provided on the first side surface at a position opposite the core.

In an optical connector module according to a second aspect, the optical connector may include a second side surface on an opposite side from the first side surface in a propagation direction of light, and a second lens portion that is curved may be provided on the second side surface.

In an optical connector module according to a third aspect, the first lens portion may be formed to be concave at the first side surface.

In an optical connector module according to a fourth aspect, the second lens portion may be formed to be convex at the second side surface.

In an optical connector module according to a fifth aspect, the refractive index matching material may adhere closely to the first lens portion and the end face.

In an optical connector module according to a sixth aspect, the refractive index matching material may fix the optical connector and the optical transmission line.

In an optical connector module according to a seventh aspect, an end face of the optical transmission line may be a curved surface projecting towards the optical connector side.

In an optical connector module according to an eighth aspect, the end face of the core may be a curved surface projecting farther towards the optical connector side than an end face of the cladding.

Advantageous Effect

An optical connector module according to an embodiment of the present disclosure can contribute to a reduction in size while reducing coupling loss.

BRIEF DESCRIPTION OF THE DRAWINGS

In the accompanying drawings:

FIG. 2 is a perspective view illustrating an enlargement of an optical transmission line unit of FIG. 1;

DETAILED DESCRIPTION

Figure 1:
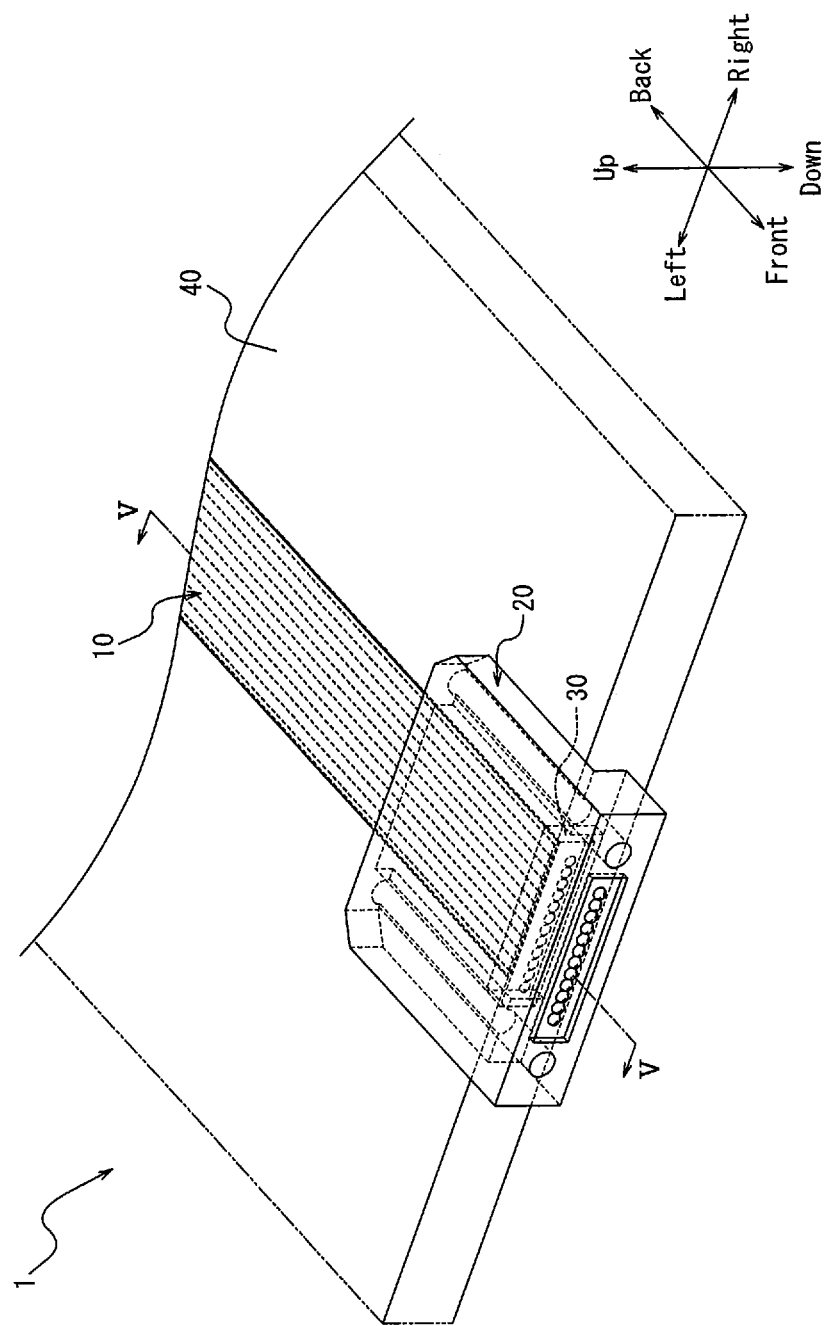
FIG. 1 is a perspective view illustrating an optical connector module according to a first embodiment.

Embodiments of the present disclosure are described below in detail with reference to the appended drawings. The front-back, left-right, and up-down directions referred to below are based on the directions of the arrows in the drawings.

First Embodiment

FIG. 1 is a perspective view illustrating an optical connector module 1 according to a first embodiment. The optical connector module 1 includes an optical transmission line 10, an optical connector 20 for optically coupling to the optical transmission line 10, and a refractive index matching material 30 for adjusting the refractive index of a space S between the optical transmission line 10 and the optical connector 20. In the first embodiment, the optical transmission line 10 is described as being an optical waveguide formed on a substrate.

FIG. 2 is a perspective view illustrating an enlargement of the optical transmission line 10 unit of FIG. 1.

As illustrated in FIG. 2, the optical transmission line 10 is formed on the upper surface of a substrate 40 configured by a rigid printed circuit board, for example. In particular, the optical transmission line 10 is disposed to project upward from a recess formed on the upper surface of the substrate 40. To couple optically with the optical connector 20, the optical transmission line 10 is formed so that the front end face matches the front end face of the substrate 40. In other words, the front end face of the optical transmission line 10 is formed to be substantially planar along the front end face of the substrate 40. The waveguide mode of the optical transmission line 10 may be either single-mode or multimode. The optical transmission line 10 is described below as being formed on the upper surface of the substrate 40, but this configuration is not limiting. For example, the optical transmission line 10 may be embedded inside the substrate 40. In this case, the front end face of the optical transmission line 10 may match the front end face of the substrate 40, and the end face of the cores 12, described below, may be formed to be exposed from the substrate 40.

The optical transmission line 10 includes a cladding 11 formed to be layered on the upper surface of the substrate 40 and a plurality of cores 12 separated from each other in the left-right direction by predetermined intervals. The cladding 11 and the cores 12 are, for example, formed by quartz glass. The refractive index of the cores 12 is higher than the refractive index of the cladding 11. The optical transmission line 10 is described below as being an embedded optical waveguide, for example, but this configuration is not limiting. The optical transmission line 10 may be any appropriate type of optical waveguide, such as a slab or semi-embedded type.

Figure 3:
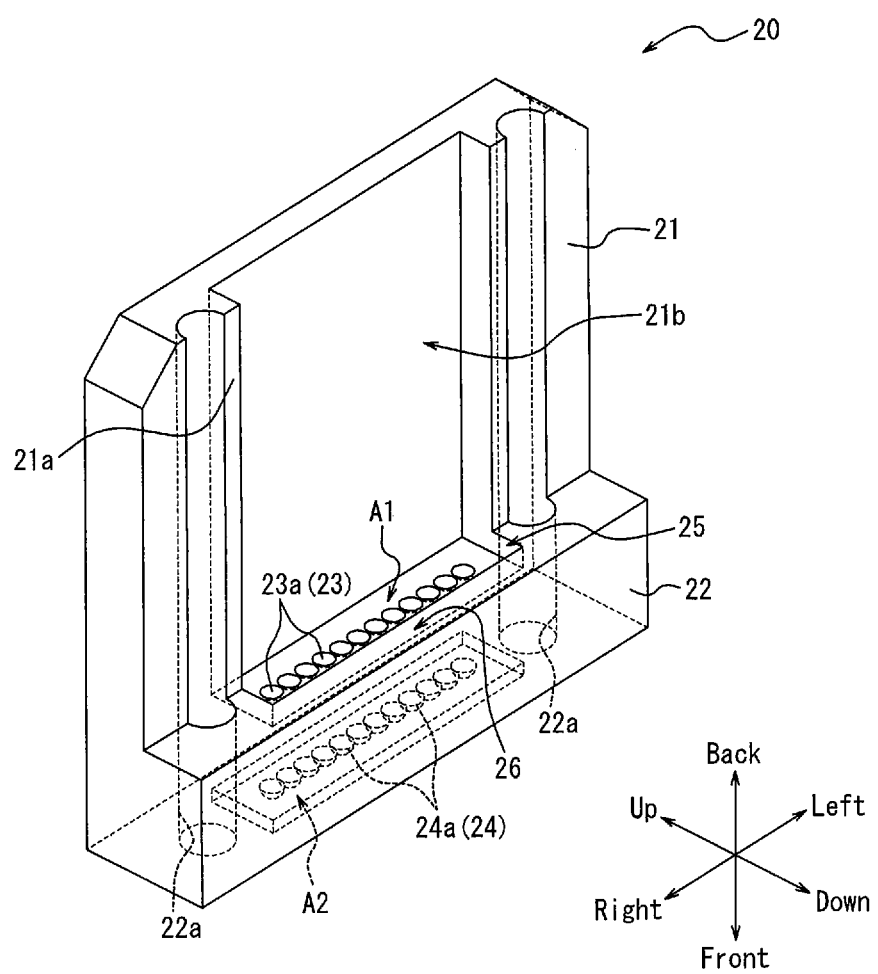
FIG. 3 is a perspective view of an optical connector unit of FIG. 1.

FIG. 3 is a perspective view of the optical connector 20 unit of FIG. 1.

For example, the optical connector 20 is configured by a material having substantially the same refractive index as that of the cores 12 of the optical transmission line 10. The optical connector 20 is substantially L-shaped. The optical connector 20 includes a first base portion 21 extending in the front-back direction. The first base portion 21 includes a recess 21b that is recessed one step inward from the substantially central portion of a lower surface 21a. The optical connector 20 includes a second base portion 22 formed to project out in front of the first base portion 21 and to be continuous with the first base portion 21. The second base portion 22 is formed to hang downwards from the first base portion 21. The optical connector 20 includes a pair of through-holes 22a that pass through from the front surface to the back surface of the second base portion 22. The through-holes 22a are formed as a pair at the left and right ends of the second base portion 22.

The optical connector 20 includes a first lens portion 23 provided on a first side surface A1 forming a portion of the inner surface of the second base portion 22. The first lens portion 23 is configured by a plurality of curved lenses 23a. The number of lenses 23a configuring the first lens portion 23 is equal to or greater than the number of cores 12 of the optical transmission line 10.

The optical connector 20 includes a second lens portion 24 provided on a second side surface A2 on the opposite side from the first side surface A1 in the propagation direction of light. The second lens portion 24 is configured by a plurality of curving lenses 24a. The number of lenses 24a configuring the second lens portion 24 is equal to or greater than the number of cores 12 of the optical transmission line 10.

The optical connector 20 includes a cutout portion 25 where the inner surface of the second base portion 22 is cut out to the first side surface A1. In other words, the cutout portion 25 is formed to be concave. The optical connector 20 includes an adhesion portion 26 formed by the four side surfaces in the up, down, left, and right directions forming the cutout portion 25, the first side surface A1, and the outer surface of the second base portion 22 positioned directly below the cutout portion 25.

The refractive index matching material 30 is configured by a material having substantially the same refractive index as that of the cores 12 of the optical transmission line 10. The refractive index matching material 30 may act as an adhesive.

Figure 4:
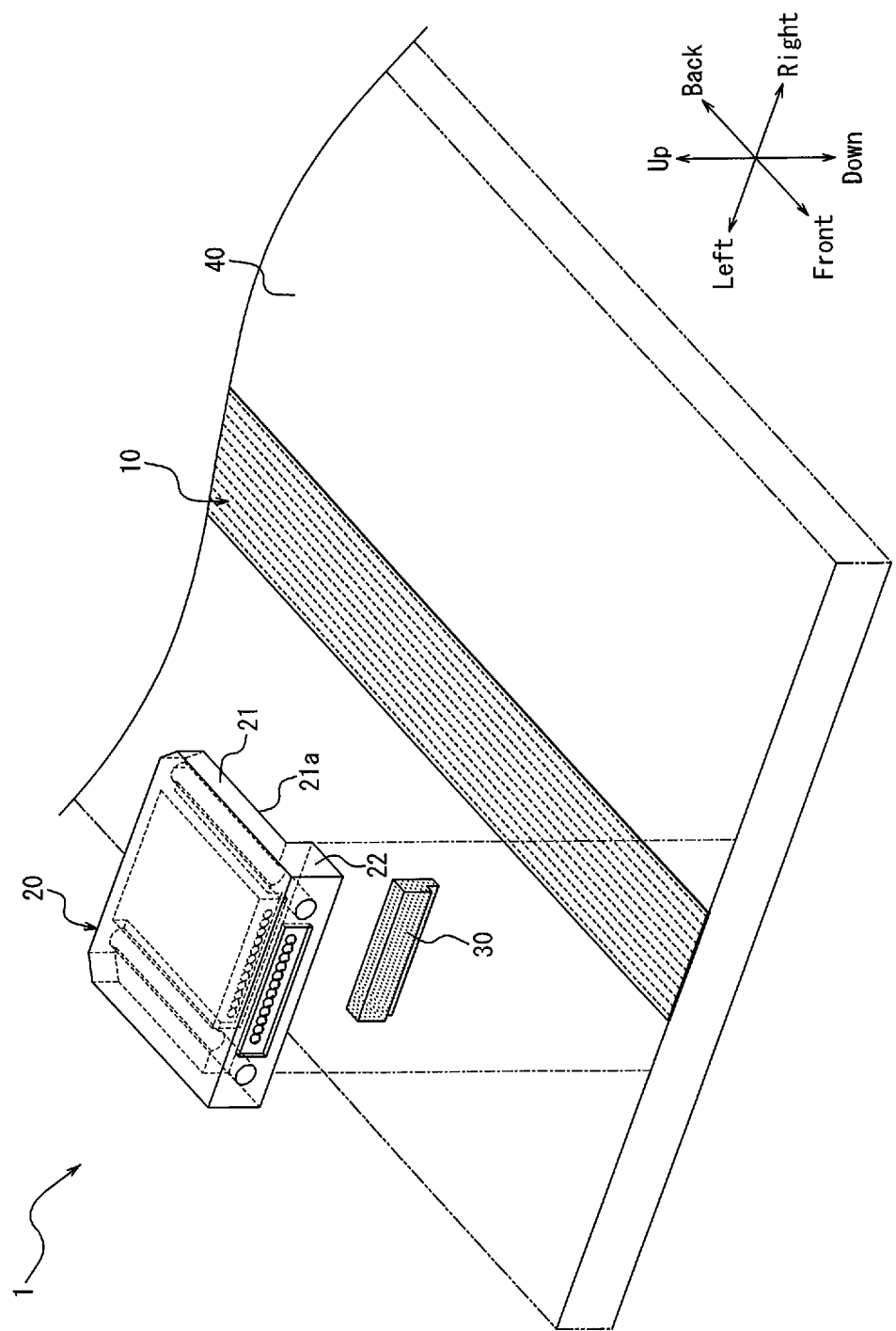
FIG. 4 is an exploded perspective view of the optical connector module of FIG. 1.
Figure 5:
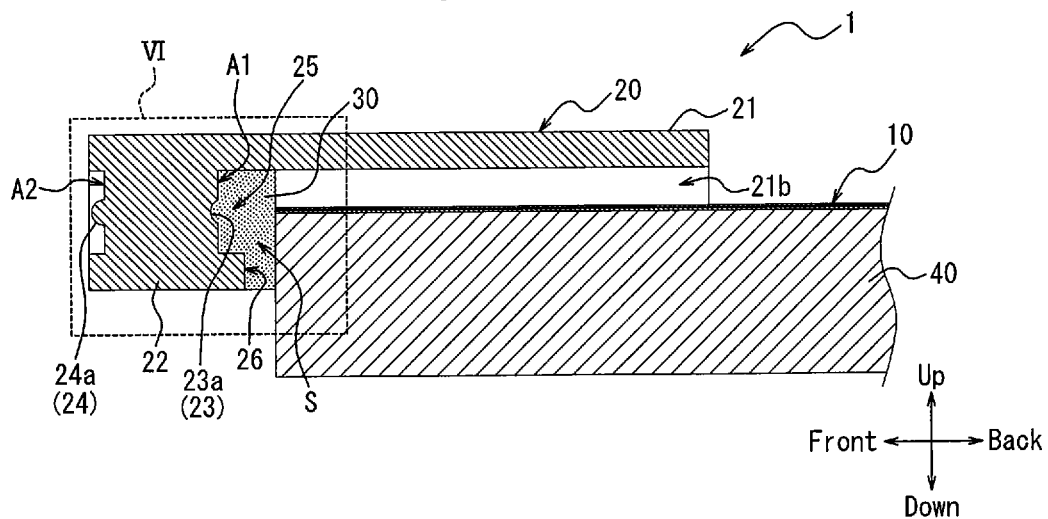
FIG. 5 is a cross-section along the V-V line in FIG. 1.
Figure 6:
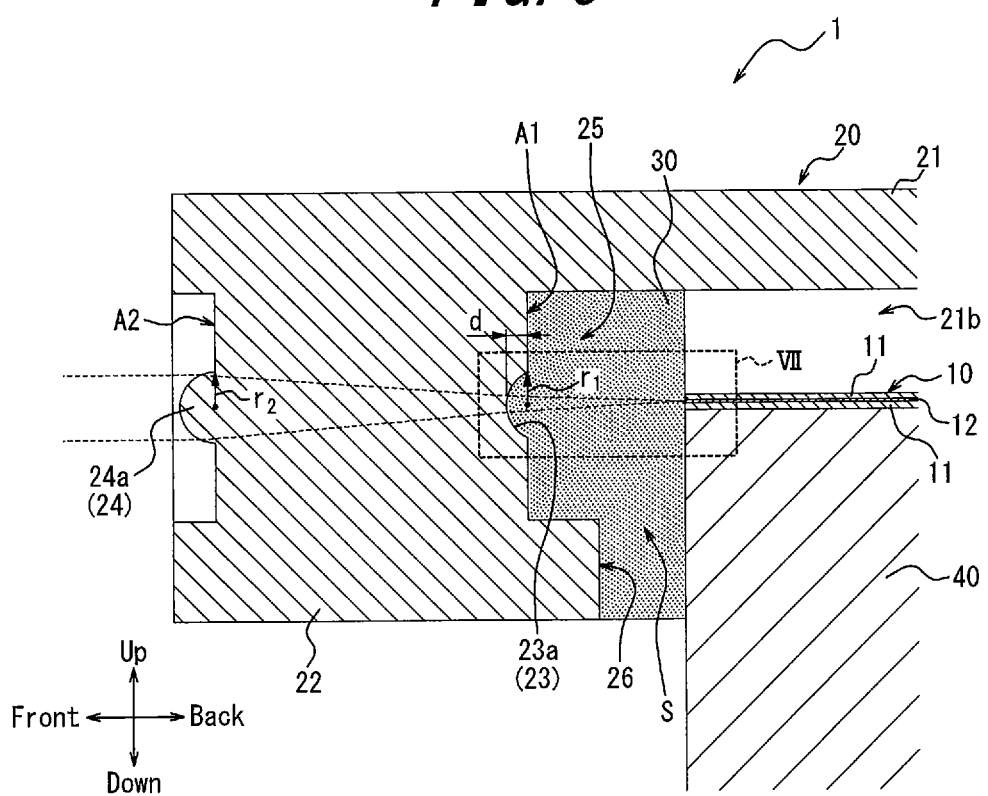
FIG. 6 is an enlarged view corresponding to portion VI of FIG. 5.

FIG. 4 is an exploded perspective view of the optical connector module 1 of FIG. 1. FIG. 5 is a cross-section along the V-V line in FIG. 1. FIG. 6 is an enlarged view corresponding to portion VI of FIG. 5.

As illustrated in FIG. 4, the optical connector 20 is attached to the substrate 40 from above the optical transmission line 10. In other words, the optical connector 20 is disposed so that the lower surface 21a of the first base portion 21 abuts the upper surface of the substrate 40 and covers a portion of the optical transmission line 10. The second base portion 22 is disposed to project out in front from the front end of the substrate 40 and hang down from the first base portion 21. In other words, the second base portion 22 projects so that the lower surface thereof is positioned below the vertical position of the optical transmission line 10.

At this time, a space S is formed between i) the optical transmission line 10 and the substrate 40 and ii) the adhesion portion 26 of the optical connector 20 (see FIG. 5). The refractive index matching material 30 is packed from below to fill the space S. In other words, the refractive index matching material 30 adjusts the refractive index of the space S between the cores 12 and the first side surface A1. The adhesion portion 26 of the optical connector 20 adheres at this time to the refractive index matching material 30. Similarly, the optical transmission line 10 and the front end face of the substrate 40 adhere to the refractive index matching material 30. In particular, the refractive index matching material 30 adheres closely to the first lens portion 23 and the end face of the cores 12. The optical transmission line 10 and the optical connector 20 are thus fixed by the refractive index matching material 30.

The refractive index matching material 30 is not limited to a configuration that fills the space S and may, for example, be packed in the area between the lower surface 21a of the optical connector 20 and the upper surface of the substrate 40. Similarly, the refractive index matching material 30 may be packed to fill the recess 21b of the optical connector 20 covering the optical transmission line 10. At least one of the substrate 40 and the optical transmission line 10 may be fixed to the optical connector 20 by the refractive index matching material 30 with such a method.

When the optical connector 20 is attached to the substrate 40, it may be positioned by an appropriate method. The optical connector 20 may, for example, be positioned by at least one of the inner surfaces of the recess 21b in the front-back direction abutting against the left-right end faces of the optical transmission line 10 projecting from the substrate 40. The optical connector 20 may, for example, include a recess with a shape corresponding to a stud pin formed on the substrate 40. At this time, the optical connector 20 may be positioned by the recess being engaged with the stud pin. The optical connector 20 may, for example, include a projection with a shape corresponding to a recess formed on the substrate 40. At this time, the optical connector 20 may be positioned by the projection being fitted to the recess.

This completes the assembly of the optical connector module 1.

As illustrated in FIG. 6, the first side surface A1 faces the front end face of the cores 12 when the optical connector module 1 is in the completed state. In particular, the first lens portion 23 faces the front end face of the cores 12. The refractive index matching material 30 is located between the first lens portion 23 and the front end face of the cores 12. The lenses 23a configuring the first lens portion 23 are, for example, formed to be concave at the first side surface A1. In other words, the lenses 23a are formed as concave lenses. In particular, the lenses 23a may be formed to be substantially semicircular in plan view, as in FIG. 6, in the propagation direction of light, i.e. the front-back direction. The half width $r_1$ in the up-down direction of the lenses 23a may be greater than the radius of the cores 12 of the optical transmission line 10. In the lenses 23a, the ratio of the width d in the propagation direction to the total width tri in the up-down direction may be ½ or less. That is, $d \leq (2r_1/2 = r_1$.

The second lens portion 24, on the other hand, faces the first lens portion 23 with the second base portion 22 of the optical connector 20 therebetween. For example, the lenses 24a configuring the second lens portion 24 are formed to be convex at the second side surface A2. In other words, the lenses 24a are formed as convex lenses. In particular, the lenses 24a may be formed to be substantially semicircular in plan view, as in FIG. 6, in the propagation direction of light, i.e. the front-back direction. The half width $r_2$ in the up-down direction of the lenses 24a may be greater than the radius of the cores 12 of the optical transmission line 10.

An example of the propagation of light when light is emitted from the front end face of the optical transmission line 10 is described with reference to FIG. 6. The optical transmission line 10 is described as transmitting light from a light-emitting element. This configuration is not limiting, and the optical transmission line 10 may transmit light to a light-receiving element. In this case, it should be understood that the following explanation can be applied in a state in which the propagation direction of light is reversed.

When the refractive index matching material 30 is configured by a material having substantially the same refractive index as that of the cores 12, the Fresnel reflection of light incident on the interface between the refractive index matching material 30 and the cores 12 is suppressed by the consistent refractive index. The light incident on this interface is therefore emitted into the refractive index matching material 30 at a high transmittance. The emitted light spreads inside the refractive index matching material 30 due to the diffraction effect and is incident on the lenses 23a. When the optical connector 20 is configured by a material having substantially the same refractive index as that of the refractive index matching material 30, the Fresnel reflection of light incident on the interface between the optical connector 20 and the refractive index matching material 30 is suppressed by the consistent refractive index. The light incident on this interface is therefore emitted into the optical connector 20, in particular the second base portion 22, at a high transmittance. When the lenses 23a are formed as concave lenses, the light emitted into the second base portion 22 spreads further and is incident on the lenses 24a. When the lenses 24a are formed as convex lenses, the light incident on the interface between the outside and the optical connector 20 is collimated by the lenses 24a. The optical connector module 1 thus propagates the light emitted from the optical transmission line 10 to the outside in a collimated state.

Figure 7:
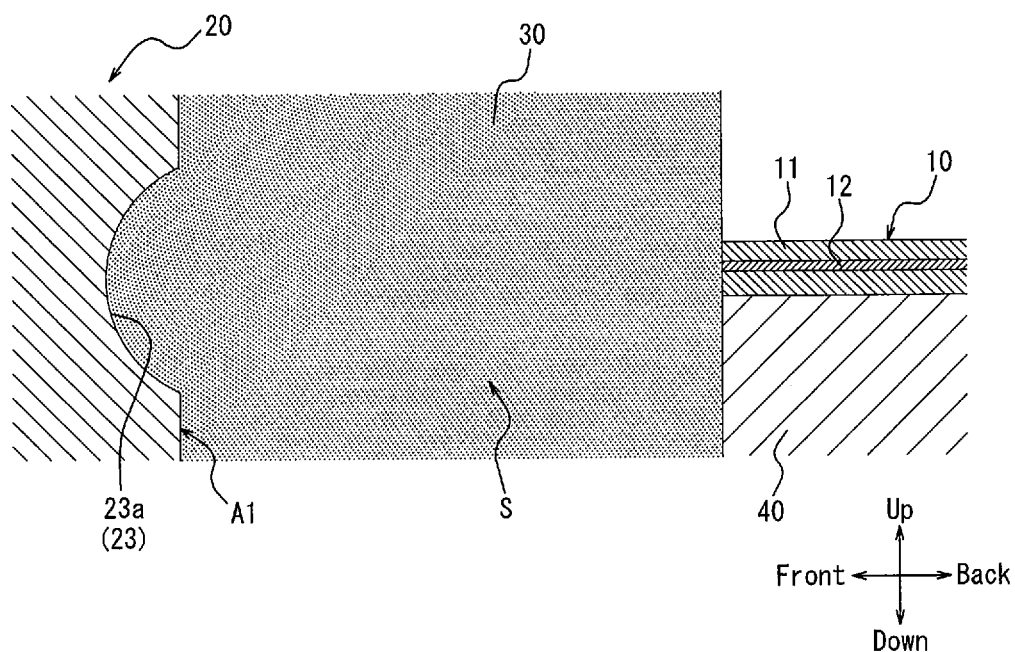
FIG. 7 is an enlarged view corresponding to portion VII of FIG. 6.
Figure 8:
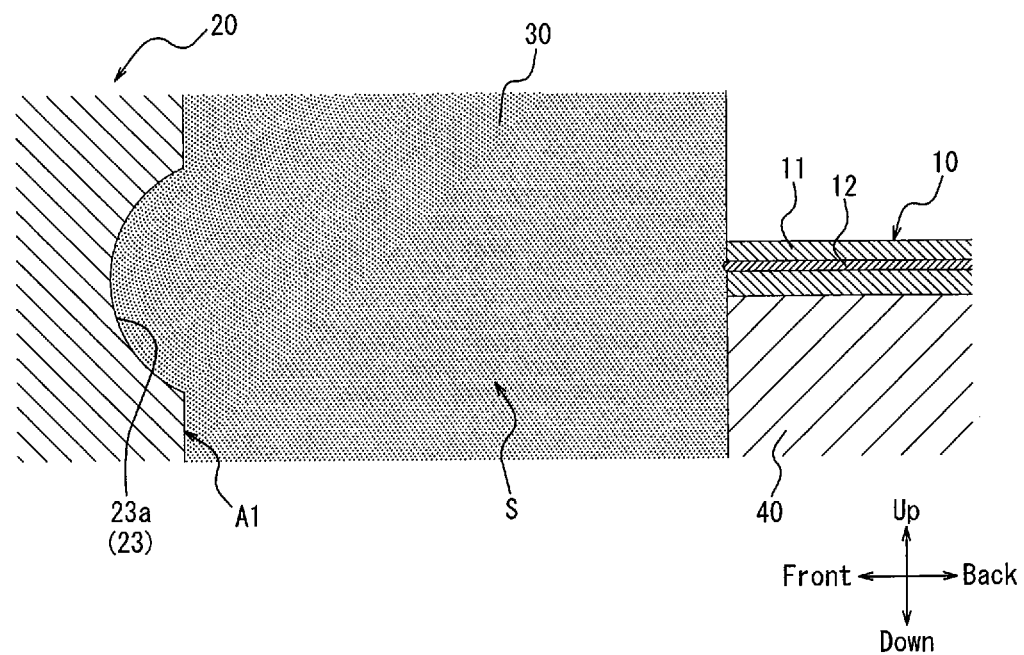
FIG. 8 is an enlarged view corresponding to FIG. 7, illustrating the state of the end face of the optical transmission line according to a modification.

FIG. 7 is an enlarged view corresponding to portion VII of FIG. 6. FIG. 7 illustrates the state of the end face of the optical transmission line 10 of FIG. 1. FIG. 8 is an enlarged view corresponding to FIG. 7, illustrating the state of the end face of the optical transmission line 10 according to a modification.

The front end face of the optical transmission line 10 matches the front end face of the substrate 40, as illustrated in FIG. 7. In other words, the front end face of the cladding 11 and the cores 12 is formed to be coplanar with the front-end face of the substrate 40. This configuration is not limiting, however. The end face of the optical transmission line 10, in particular the end face of the cores 12, may be a curved surface projecting towards the optical connector 20, as illustrated in FIG. 8. In particular, the end face of the cores 12 may be a curved surface projecting further towards the optical connector 20 than the end face of the cladding 11.

This optical connector module 1 according to the first embodiment can contribute to a reduction in size while reducing coupling loss. In other words, by the first lens portion 23 being provided on the first side surface A1 at a position facing the cores 12, the optical connector module 1 can reduce the distance over which the diffraction effect of light occurs and thus reduce coupling loss. The distance between the first lens portion 23 and the optical transmission line 10 is short in the optical connector module 1, contributing to an overall reduction in size. In particular, the optical connector module 1 can reduce the width in the propagation direction of light.

Interposition of the refractive index matching material 30 allows the optical connector module 1 to reduce the coupling loss. That is, the optical connector module 1 can reduce the loss due to the diffraction effect, the loss accompanying scattering or absorption of light due to foreign material from the outside, and the loss due to Fresnel reflection.

Specifically, the refractive index matching material 30 that has substantially the same refractive index as the refractive index of the cores 12 is disposed in the optical path, allowing the optical connector module 1 to suppress the spreading of light due to the diffraction effect as compared to propagation through air. The optical connector module 1 can thereby reduce the proportion of light that does not couple to the first lens portion 23 due to the diffraction effect.

Furthermore, the refractive index matching material 30 functions to prevent foreign material from entering. In other words, by the refractive index matching material 30 being packed into the space S, the optical connector module 1 can prevent foreign material from entering from the outside. The optical connector module 1 can thereby prevent the loss that accompanies scattering or absorption of light due to foreign material from the outside and can reduce the coupling loss.

Furthermore, the refractive index of the refractive index matching material 30 is substantially the same as the refractive index of the cores 12, allowing the optical connector module 1 to suppress Fresnel reflection at the interface between the refractive index matching material 30 and the cores 12. That is, the optical connector module 1 can improve the coupling efficiency by causing light to be emitted from the cores 12 at a high transmittance.

The optical connector module 1 includes the curved second lens portion 24, which in combination with the first lens portion 23 allows optical adjustment with two lens portions. That is, the optical connector module 1 can improve the degree of freedom of optical adjustment through the use of two lens portions. The optical connector module 1 can thereby easily provide emission light having a desired beam state.

By the first lens portion 23 being formed as a concave lens, the optical connector module 1 can force the light emitted from the cores 12 to spread. In particular, by a concave lens being provided on the first side surface A1 at a position facing the cores 12, the optical connector module 1 can force light, whose spreading was suppressed by the refractive index matching material 30, to spread at an early stage after emission.

By the second lens portion 24 being formed as a convex lens, the optical connector module 1 can convert light that was spread by the first lens portion 23, which is a concave lens, to collimated light. The combination of a concave lens and a convex lens from the first lens portion 23 and the second lens portion 24 in particular allows the optical connector module 1 to provide large-diameter collimated light. Consequently, the optical connector module 1 can provide collimated light that can be collected efficiently on a smaller spot. The optical connector module 1 can, in other words, emit collimated light with good characteristics. The optical connector module 1 can also increase the allowable range of optical coupling by large-diameter collimated light. That is, the optical connector module 1 allows optical coupling within a predetermined allowable range even if the optical axis is misaligned from another module that is the target of optical coupling.

By the refractive index matching material 30 adhering closely to the first lens portion 23 and the end face of the cores 12, the optical connector module 1 can more effectively suppress the spread of light due to the diffraction effect. The optical connector module 1 can thereby further reduce the proportion of light that does not couple to the first lens portion 23 due to the diffraction effect. This configuration also allows the optical connector module 1 to reduce the width of the space S in the propagation direction of light. In this way, the optical connector module 1 can contribute to reducing the size overall, in particular the width in the propagation direction of light.

By the optical transmission line 10 and the optical connector 20 being fixed by the refractive index matching material 30, the optical connector module 1 can suppress optical axis misalignment due to use, deterioration over time, and the like. Accordingly, the optical connector module 1 can maintain substantially identical optical characteristics over an extended period of time, with the relative positions remaining as initially determined. The optical connector module 1 can thereby improve product quality.

The optical connector module 1 contributes to improving productivity by maintaining the end face of the optical transmission line 10 as a curved surface projecting towards the optical connector 20. In other words, the end face of the optical transmission line 10 does not require polishing in the optical connector module 1, allowing a portion of the production process to be omitted. The optical connector module 1 thereby also contributes to reducing production costs. In this case, Fresnel reflection at the end face of the optical transmission line 10 tends to increase as compared to a plane with low flatness. The optical connector module 1 can suppress Fresnel reflection, however, by the end face of the optical transmission line 10 abutting against the refractive index matching material 30. By the end face of the optical transmission line 10 being a curved surface projecting towards the optical connector 20, the optical connector module 1 can also achieve a lens effect at this end face.

The optical connector module 1 more notably achieves the aforementioned related effects when the end face of the cores 12 is a curved surface projecting further towards the optical connector 20 than the end face of the cladding 11.

When the half width $r_1$ of the first lens portion 23 is greater than the radius of the cores 12, the optical connector module 1 can use the first lens portion 23 to receive, without leakage, the light that spreads after being emitted from the end face of the cores 12. The optical connector module 1 can thereby suppress coupling loss due to diffraction. The optical connector module 1 can further suppress coupling loss due to diffraction by adopting a similar configuration in the second lens portion 24 as well.

The optical connector module 1 can suppress Fresnel reflection and reduce coupling loss by both the refractive index matching material 30 and the optical connector 20 being configured by material having substantially the same refractive index as the refractive index of the cores 12.

Second Embodiment

Figure 9:
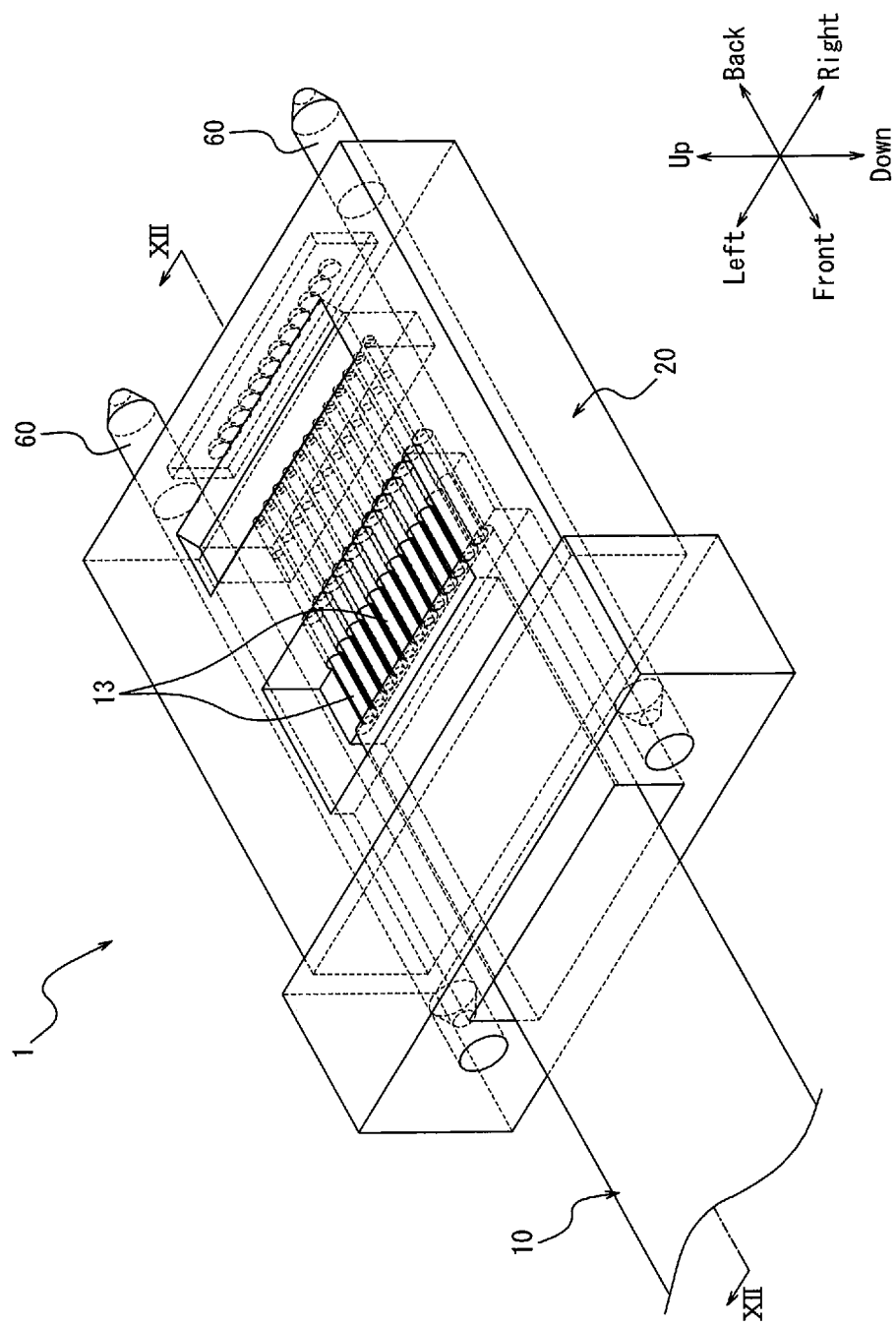
FIG. 9 is a perspective view illustrating an optical connector module according to a second embodiment.

FIG. 9 is a perspective view illustrating an optical connector module 1 according to a second embodiment. The optical connector module 1 according to the second embodiment differs from the first embodiment in that the optical transmission line 10 is configured by optical fibers 13. Components that the optical connector module 1 according to the second embodiment has in common with the first embodiment are labeled with the same reference signs. A description of the common components and the functions thereof is omitted to focus mainly on the differences from the first embodiment.

The optical transmission line 10 is configured by a plurality of optical fibers 13, as illustrated in FIG. 9. Each optical fiber 13 includes a cladding 11 and a core 12 (see FIG. 14). As necessary, each optical fiber 13 also includes a coating. The cladding 11 may be configured by glass or resin. Similarly, the core 12 may be configured by glass or resin. The waveguide mode of each optical fiber 13 may be either single-mode or multi-mode. Each optical fiber 13 may be any type of optical fiber, such as a general-purpose single-mode fiber, a dispersion shifted single-mode fiber, or a step index multi-mode optical fiber. The plurality of optical fibers 13 may optionally be bundled to be covered by a sheath. The plurality of optical fibers 13 are, for example, arranged side-by-side in the left-right direction inside the optical connector 20.

Figure 10:
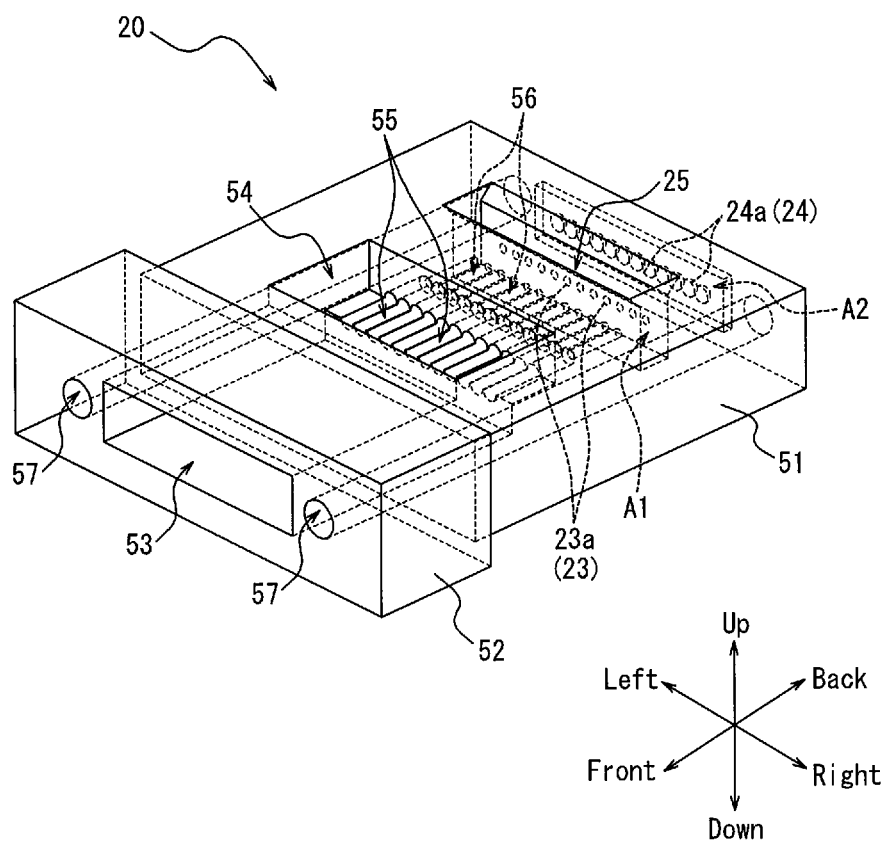
FIG. 10 is a perspective view of an optical connector unit of FIG. 9.

FIG. 10 is a perspective view of the optical connector 20 unit of FIG. 9.

The optical connector 20 may be configured by a material having substantially the same refractive index as that of the cores 12 of the optical transmission line 10. The optical connector 20 includes a base portion 51 and an opening portion 52 formed continuously in front of the base portion 51.

An opening 53 for insertion of the optical transmission line 10 is formed in the opening portion 52. In the base portion 51, the optical connector 20 includes a holding portion 54 for holding the plurality of optical fibers 13. The optical connector 20 includes a plurality of guide grooves 55 in the holding portion 54. The plurality of guide grooves 55 are grooves for holding the plurality of optical fibers 13 configuring the optical transmission line 10. The number of guide grooves 55 is equal to or greater than the number of optical fibers 13 configuring the optical transmission line 10.

The optical connector 20 includes a plurality of through-holes 56 respectively connected to the plurality of guide grooves 55. The optical connector 20 includes holding holes 57 for holding guide pins 60. The holding holes 57 are formed as a pair at the left and right ends of the optical connector 20 so as to pass through the left and right ends of the base portion 51 and the opening portion 52.

The optical connector 20 includes a cutout portion 25 where the upper surface of the base portion 51 is cut out. In other words, the cutout portion 25 is formed to be substantially concave. The optical connector 20 includes a first lens portion 23 provided on a first side surface A1 forming a portion of the inner surface of the cutout portion 25. The optical connector 20 includes a second lens portion 24 provided on a second side surface A2 on the opposite side from the first side surface A1 in the propagation direction of light.

Figure 11:
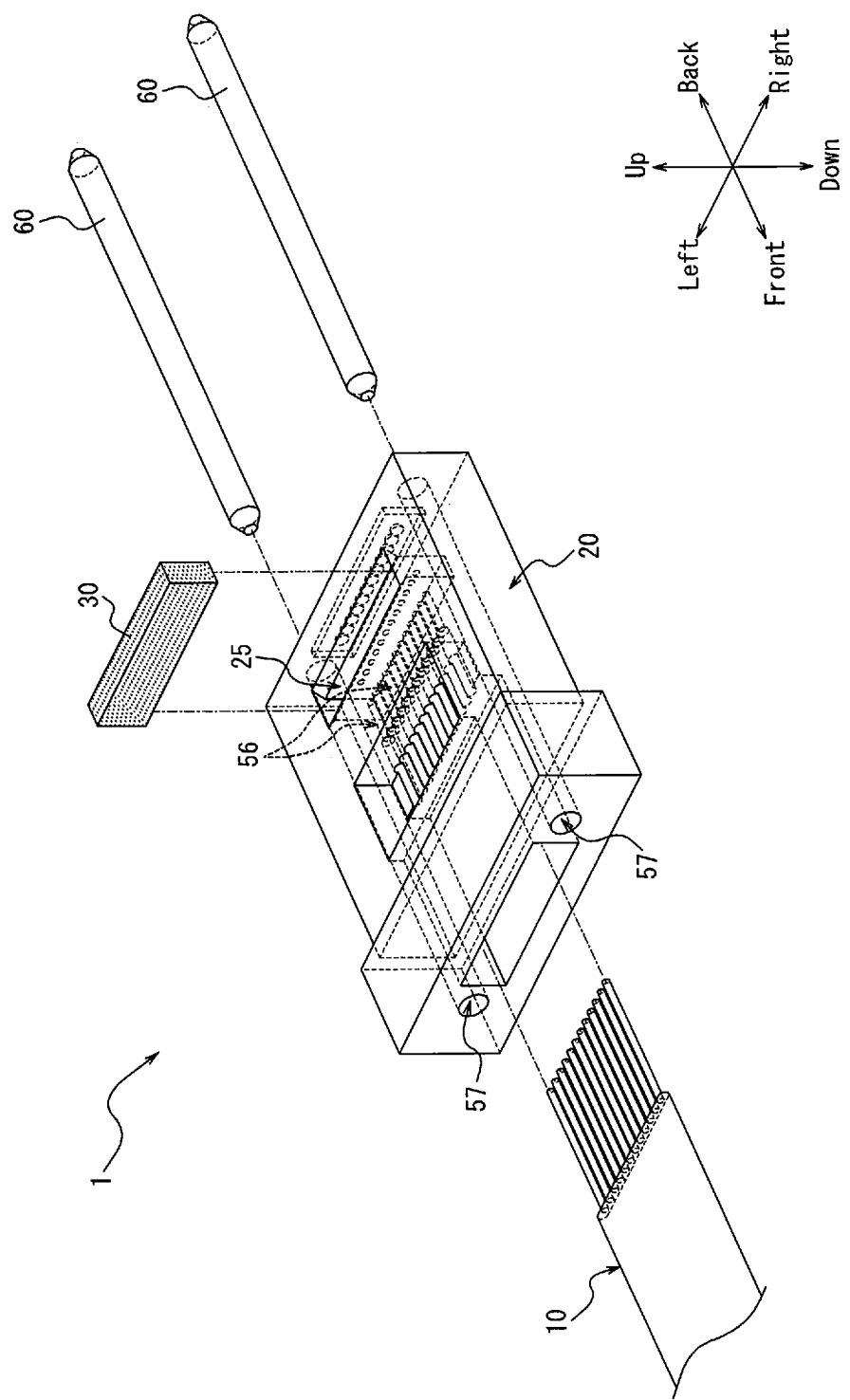
FIG. 11 is an exploded perspective view of the optical connector module of FIG. 9.
Figure 12:
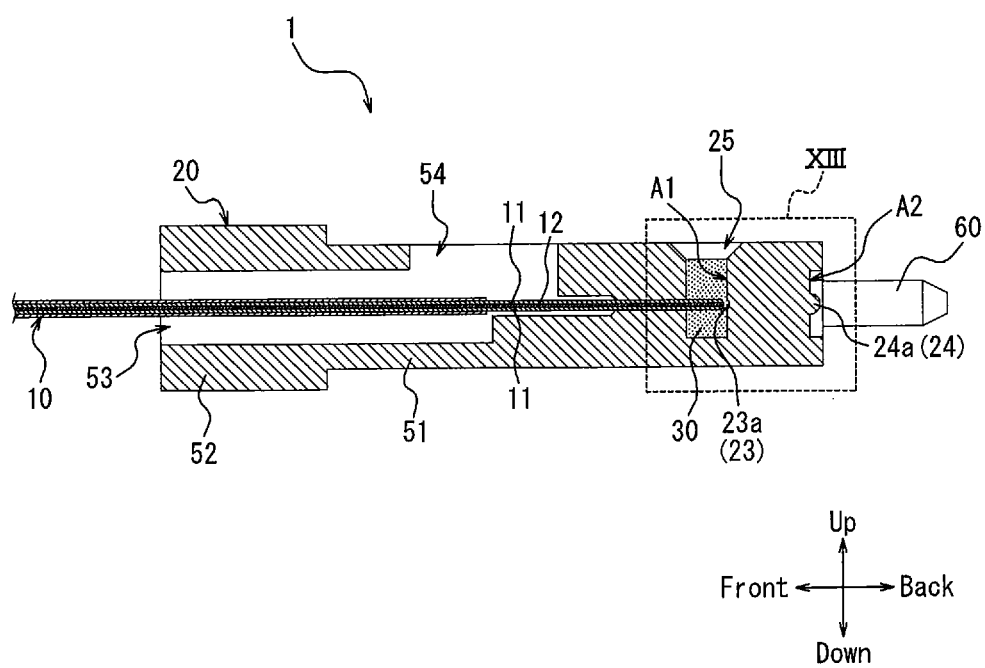
FIG. 12 is a cross-section along the XII-XII line in FIG. 9.
Figure 13:
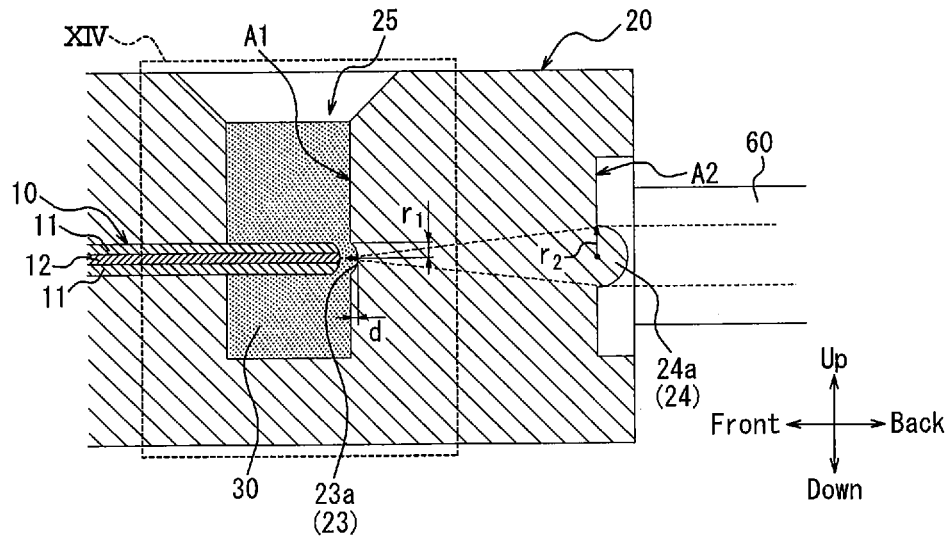
FIG. 13 is an enlarged view corresponding to portion XIII of FIG. 12.

FIG. 11 is an exploded perspective view of the optical connector module 1 of FIG. 9. FIG. 12 is a cross-section along the XII-XII line in FIG. 9. FIG. 13 is an enlarged view corresponding to portion XIII of FIG. 12.

The optical transmission line 10 is inserted into the optical connector 20 from the front, as illustrated in FIG. 11. The optical transmission line 10 is held by the optical connector 20 in a state such that the end of the cladding 11 and the core 12 is exposed farther back than the through-holes 56. The refractive index matching material 30 is packed from above to fill the cutout portion 25. The left-right pair of guide pins 60 is inserted in the holding holes 57 of the optical connector 20 that holds the optical transmission line 10.

This completes the assembly of the optical connector module 1.

As illustrated in FIGS. 12 and 13, the first lens portion 23, the second lens portion 24, and the refractive index matching material 30 are configured in the same way as the first embodiment when the optical connector module 1 is in a completed state. The propagation of light is also similar when light is emitted from the back end face of the optical transmission line 10. The propagation of light when light is incident from the second lens portion 24 is also similar, and it should be understood that the description in the first embodiment can be applied in a state in which the propagation direction of light is reversed.

Figure 14:
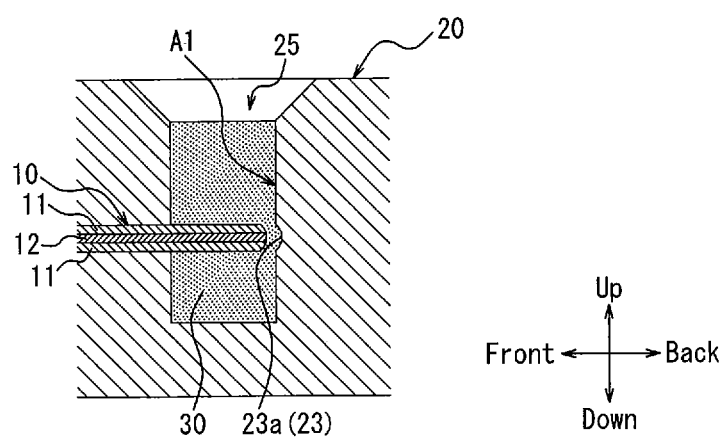
FIG. 14 is an enlarged view corresponding to portion XIV of FIG. 13.
Figure 15:
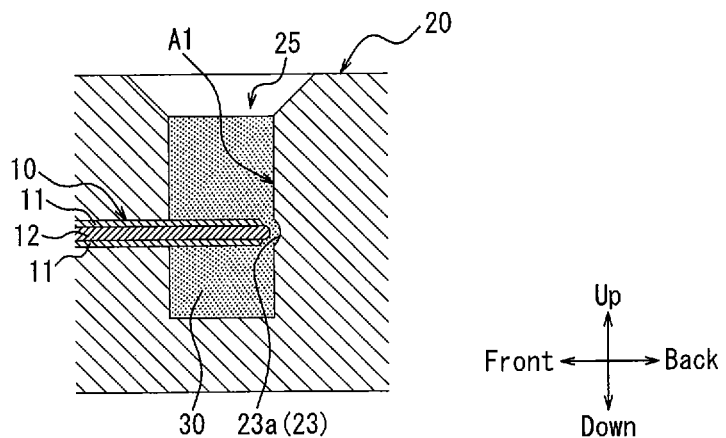
FIG. 15 is an enlarged view corresponding to FIG. 14, illustrating the state of the end face of the optical transmission line according to a modification.

FIG. 14 is an enlarged view corresponding to portion XIV of FIG. 13. FIG. 14 illustrates the state of the end face of the optical transmission line 10 of FIG. 9. FIG. 15 is an enlarged view corresponding to FIG. 14, illustrating the state of the end face of the optical transmission line 10 according to a modification.

The end face of the optical transmission line 10 is a curved surface projecting towards the optical connector 20, in particular towards the first side surface A1, as illustrated in FIG. 14. For example, the end face of the optical transmission line 10 is configured so that the end faces of the cladding 11 and the cores 12 are the same curved surface. This configuration is not limiting, however. The end face of the optical transmission line 10, in particular the end face of the cores 12, may be curved to project further towards the first side surface A1 than the end face of the cladding 11, as illustrated in FIG. 15.

This optical connector module 1 according to the second embodiment can achieve effects similar to those of the first embodiment.

Third Embodiment

Figure 16:
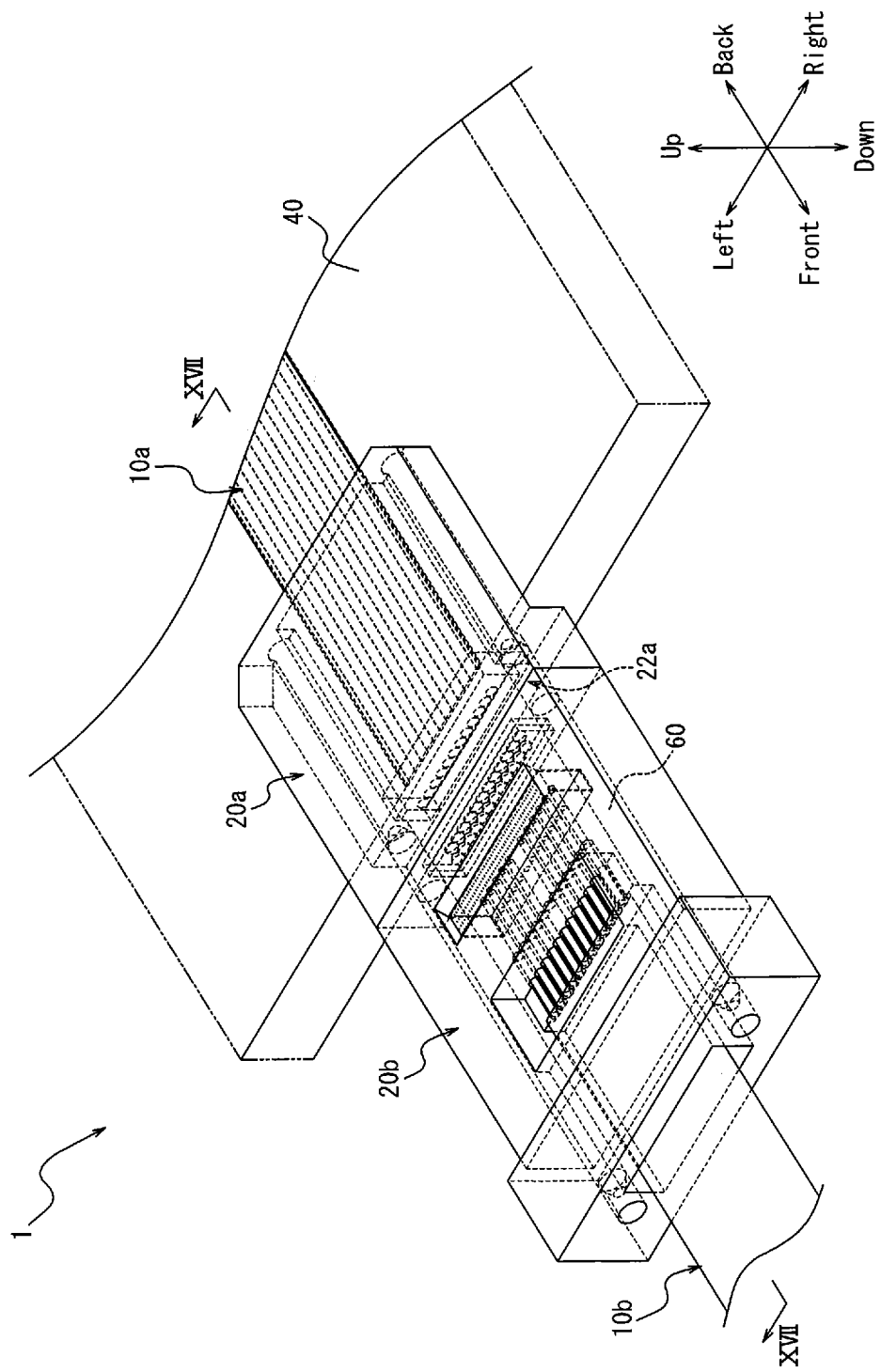
FIG. 16 is a perspective view illustrating an optical connector module according to a third embodiment.
Figure 17:
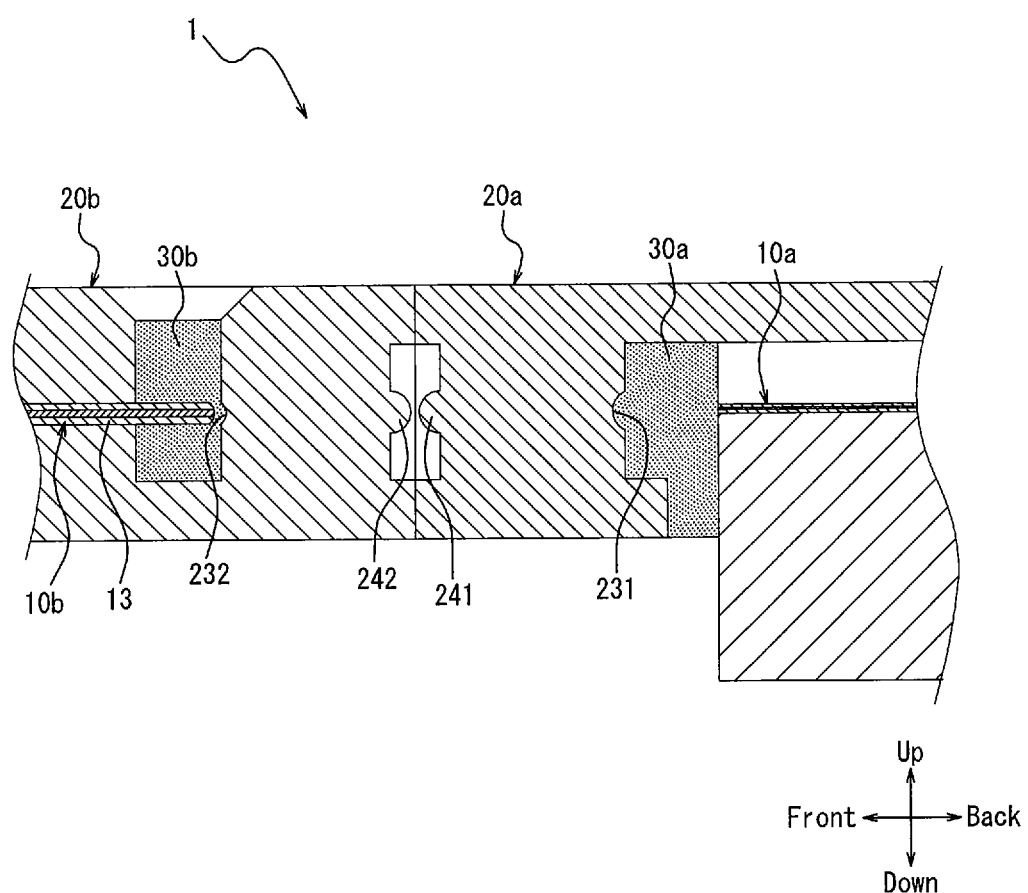
FIG. 17 is an enlargement of a cross-sectional portion along the XVII-XVII line in FIG. 16.

FIG. 16 is a perspective view illustrating an optical connector module 1 according to a third embodiment. FIG. 17 is an enlargement of a cross-sectional portion along the XVII-XVII line in FIG. 16. The optical connector module 1 according to the third embodiment combines the optical system according to the first embodiment and the optical system according to the second embodiment. Components in the optical connector module 1 according to the third embodiment that are the same as in the first embodiment and the second embodiment are labeled with the same reference signs. A description of the common components and the functions thereof is omitted to focus mainly on the differences from the first embodiment and the second embodiment.

As illustrated in FIG. 16, the optical connector module 1 according to the third embodiment connects an optical connector 20a according to the first embodiment and an optical connector 20b according to the second embodiment to optically couple an optical transmission line 10a according to the first embodiment and an optical transmission line 10b according to the second embodiment.

In greater detail, the optical connector 20a and the optical connector 20b are placed side-by-side in the front-back direction so that their positions in the up-down and left-right directions substantially match. In this state, a pair of guide pins 60 is inserted in through-holes 22a. The optical connector 20a and the optical connector 20b are connected as a result. At this time, the position of the optical connector 20b relative to the optical connector 20a is determined by the through-holes 22a. Consequently, the end face of the optical transmission line 10a and the end face of the optical transmission line 10b are disposed along substantially identical optical axes, and the optical waveguides constituting the optical transmission line 10a are optically coupled respectively to the corresponding optical fibers 13 constituting the optical transmission line 10b, as illustrated in FIG. 17.

For example, the light emitted from the optical transmission line 10a passes through the refractive index matching material 30a, the first lens portion 231, and the second lens portion 241 and is emitted as collimated light. The collimated light passes through the second lens portion 242, the first lens portion 232, and the refractive index matching material 30b and is incident on the optical fibers 13. The same explanation applies when the propagation direction of light is reversed.

This optical connector module 1 according to the third embodiment can achieve effects similar to those of the first embodiment and the second embodiment. The optical connector module 1 according to the third embodiment can, with large-diameter collimated light, optically couple two different optical transmission lines 10a, 10b in a state allowing efficient light collection and a broad allowable range of light coupling.

It will be clear to a person of ordinary skill in the art that the present disclosure may be implemented in ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are considered to be included therein.

For example, the refractive index matching material 30 has been described above being packed into the entire space S, but this configuration is not limiting. The refractive index matching material 30 may be disposed in only a portion of the space S, as long as the refractive index matching material 30 is between the first side surface A1 and the end face of the cores 12 and the desired optical characteristics can be achieved.

The shape of the first lens portion 23 and the second lens portion 24 has been described above as being substantially semicircular in plan view, but this configuration is not limiting. The shape of the first lens portion 23 and the second lens portion 24 may be spherical or aspherical.

The first lens portion 23 is not limited to a configuration satisfying the condition $d \leq (2r_1/2 = r_1)$. As long as the desired optical characteristics can be obtained, the ratio of the width d to the full width $2r_1$ in the first lens portion 23 may be greater than ½.

The first lens portion 23 has been described as being a concave lens but is not limited to this configuration. The first lens portion 23 may be any type of lens, such as a convex lens, as long as the desired optical characteristics can be obtained.

The optical connector 20 need not include the second lens portion 24, as long as the desired optical characteristics can be obtained. The second lens portion 24 is not limited to being a convex lens but rather may be any type of lens, such as a concave lens.

The end face of the optical transmission line 10 configured by optical waveguides or optical fibers 13 may be a flat or curved surface. When formed by a curved surface, this end face may be a concave surface or a convex surface. In particular, the shape and position of the cladding 11 and cores 12 of the optical transmission line 10 is not limited to the examples in FIGS. 7, 8, 14, and 15. The end face of the cladding 11 and the cores 12 of the optical transmission line 10 may have any shape and be disposed at any position, as long as the desired optical characteristics can be obtained. For example, if the cores 12 and the first lens portion 23 are separated, and the refractive index matching material 30 is packed in the space therebetween, then the cladding 11 may abut against the optical connector 20, in particular the first side surface A1.

REFERENCE SIGNS LIST

1 Optical connector module
10, 10a, 10b Optical transmission line
11 Cladding
12 Core
13 Optical fiber
20, 20a, 20b Optical connector
21 First base portion
21a Lower surface
21b Recess
22 Second base portion
22a Through-hole
23, 231, 232 First lens portion
23a Lens
24, 241, 242 Second lens portion
24a Lens
25 Cutout portion
26 Adhesion portion
30, 30a, 30b Refractive index matching material
40 Substrate
51 Base portion
52 Opening portion
53 Opening
54 Holding portion
55 Guide groove
56 Through-hole
57 Holding hole
60 Guide pin
A1 First side surface
A2 Second side surface
S Space

The invention claimed is:

1. An optical connector module comprising:
an optical transmission line comprising a core and a cladding layered on a substrate;
an optical connector comprising a first side surface facing an end face of said optical transmission line and an end face of said substrate, wherein the optical connector is configured to couple optically to said optical transmission line; and
a refractive index matching material configured to be located between said end face of said optical transmission line and said first side surface and between said end face of said substrate and said first side surface, wherein the refractive index matching material is configured to adjust a refractive index,
wherein a first lens portion that is curved is provided on said first side surface at a position opposite said core,
wherein said first lens portion is formed as a concave shape at said first side surface,
wherein said refractive index matching material fills said concave shape at said first side surface and adheres to said end face of said optical transmission line, said end face of the said substrate and said first side surface.

2. The optical connector module of claim 1,
wherein said optical connector comprises a second side surface on an opposite side from said first side surface in a propagation direction of light; and
wherein a second lens portion that is curved is provided on said second side surface.

3. The optical connector module of claim 2, wherein said second lens portion is formed to be convex at said second side surface.

4. The optical connector module of claim 1, wherein said refractive index matching material fixes said optical connector and said optical transmission line.

5. The optical connector module of claim 1, wherein said end face of said optical transmission line is a curved surface projecting towards said optical connector side.

6. The optical connector module of claim 1, wherein an end face of said core is a curved surface projecting farther towards said optical connector side than an end face of said cladding.

\* \* \* \* \*